United States Patent

[11] 3,595,237

| [72] | Inventors | David O. Sargent<br>Westfield;<br>Vladimir Marchuk, Somerville, both of, N.J. |
|---|---|---|
| [21] | Appl. No. | 863,887 |
| [22] | Filed | Oct. 6, 1969 |
| [45] | Patented | July 27, 1971 |
| [73] | Assignee | Personal Products Company |

[54] ADHESIVE ATTACHMENT OF REMOVABLE PROTECTIVE LINERS FOR NETHER GARMENTS
8 Claims, 9 Drawing Figs.

[52] U.S. Cl. .................................................. 128/290, 117/122 PF
[51] Int. Cl. .................................................. A61f 13/16
[50] Field of Search .................................... 128/284, 287, 286, 288—291; 117/122 P, 122 PF

[56] References Cited
UNITED STATES PATENTS

| 2,824,026 | 2/1958 | Homeyer et al. | 117/122 PF |
| 3,044,467 | 7/1962 | Campall | 128/290 |
| 3,059,644 | 10/1962 | Atkinson | 128/290 |
| 3,067,747 | 12/1962 | Wolterding et al. | 128/290 X |
| 3,315,677 | 4/1967 | Tyrrell, Jr. | 128/288 |
| 3,374,134 | 3/1968 | Waldman | 117/122 PF |

*Primary Examiner*—Charles F. Rosenbaum
*Attorneys*—W. Frederick Mayer, Jr. and Robert L. Minier ABSTRACT: A protective liner which is temporarily, but securely, held to the interior crotch portion of nether garments by a thermoplastic, pressure-sensitive adhesive pattern bonded to a thermoplastic protective film provided on the under surface of the liner. The thermoplastic, pressure-sensitive adhesive is permanently fused to the protective film thus preventing delamination of the pressure-sensitive adhesive patterns from the film, and the adhesion level of the pressure-sensitive adhesive is such as to temporarily, but securely, adhere the protective liner to the crotch portion of the nether garment. The thermoplastic adhesive pattern is indirectly applied to the thermoplastic adhesive barrier film to prevent basic distortion of the film which would render it unfit for its intended protective function.

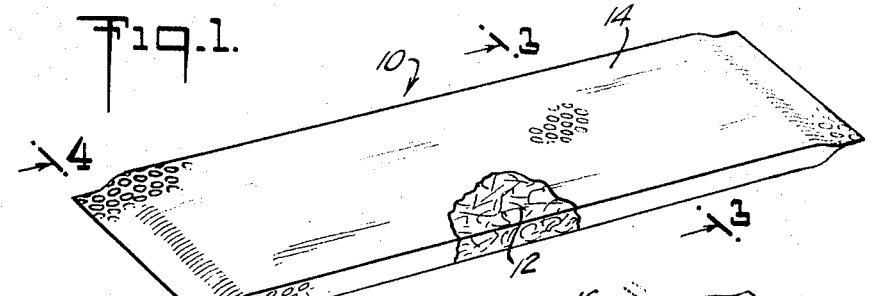
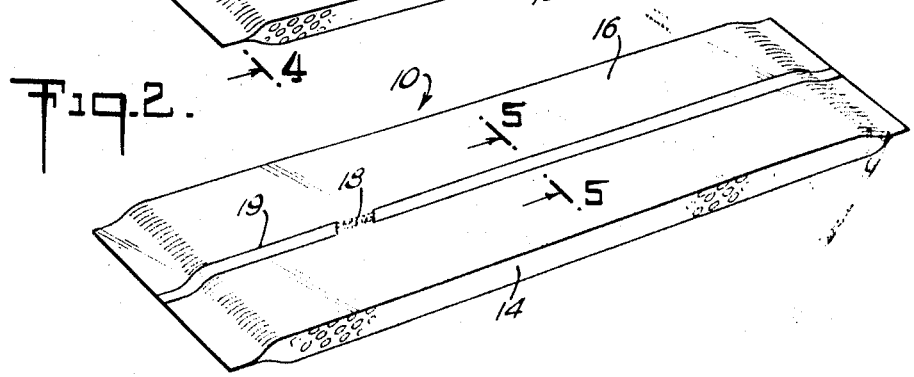
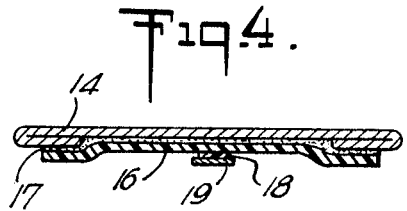
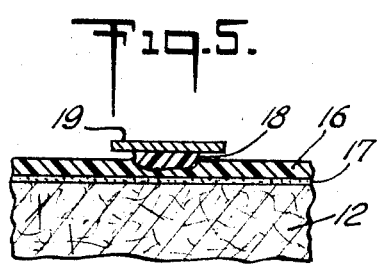
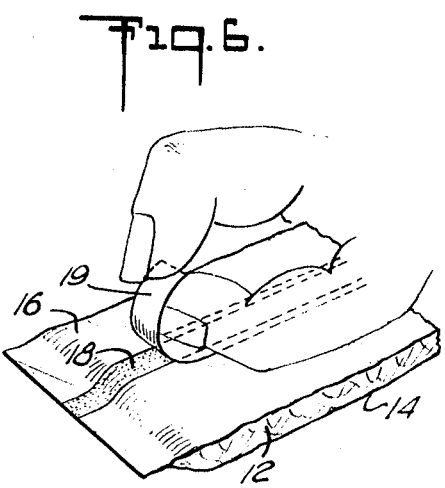
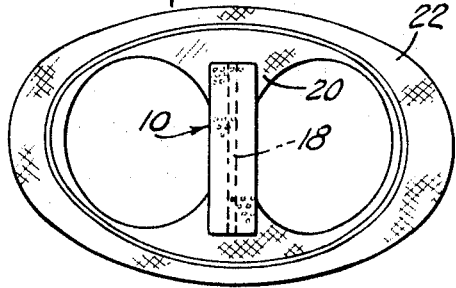

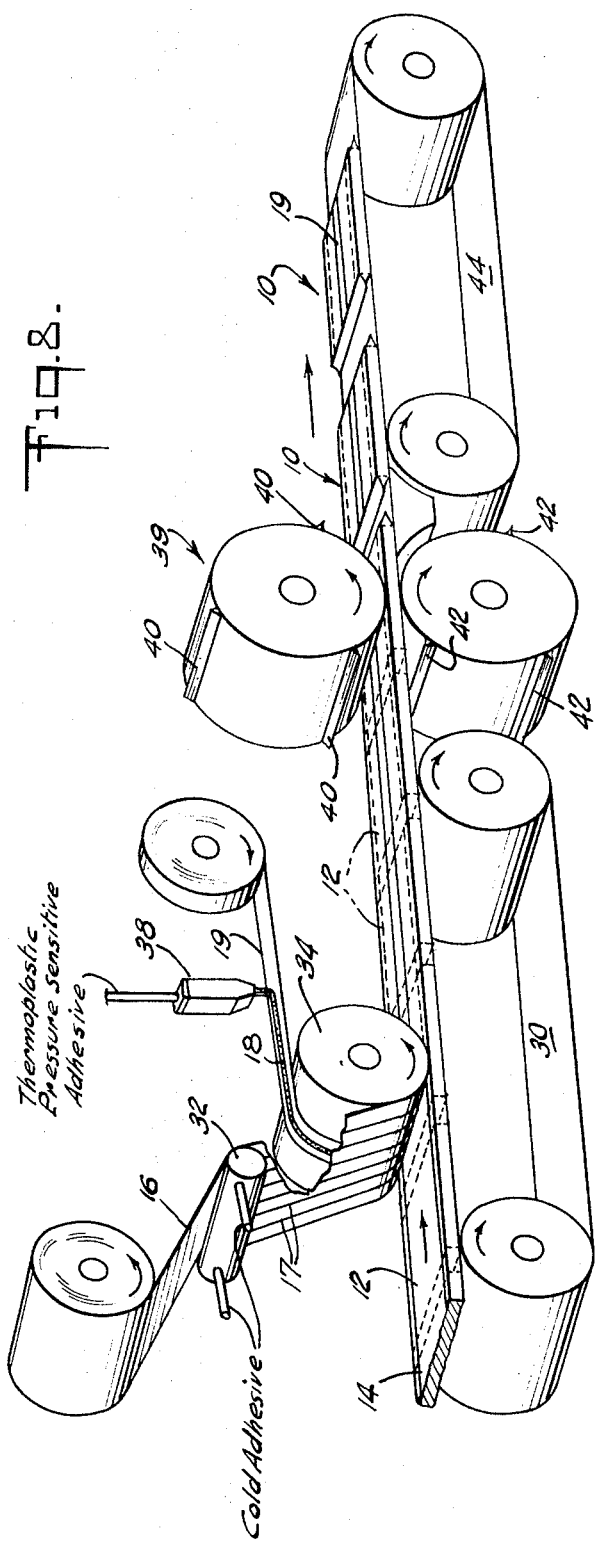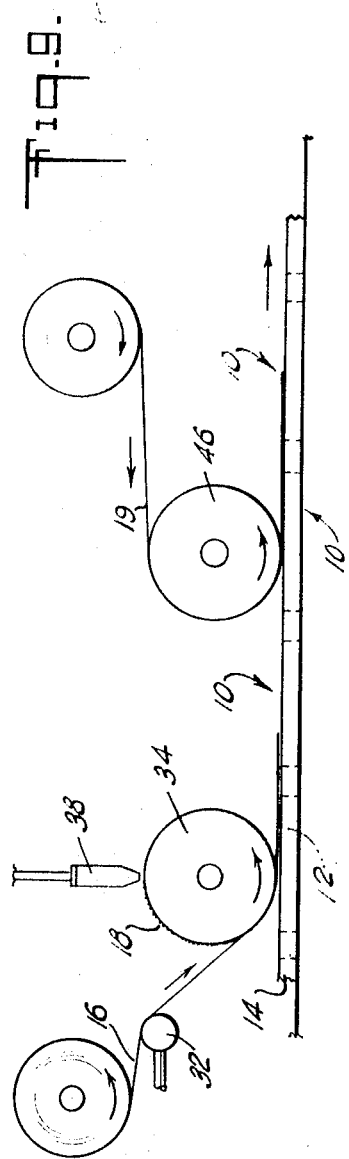

3,595,237

ADHESIVE ATTACHMENT OF REMOVABLE PROTECTIVE LINERS FOR NETHER GARMENTS

BACKGROUND OF THE INVENTION

This invention relates to absorbent pads and more particularly, is directed to an improved removable liner for protecting the crotch portion of nether garments against staining from vaginal or rectal discharges.

Many attempts have been made heretofore to provide an absorbent protective pad to be worn in the crotch portion of undergarments to protect the same from staining, for example, during the menstrual period when catamenial devices are employed to absorb the menstrual discharges. Sanitary napkins which are used by many during the menstrual period are conventionally provided with attachment tabs extending beyond the ends of an absorbent core which are secured to a separate suspensory belt that encircles the hips of the wearer. However, to eliminate the need for a separate suspensory belt it has been proposed to provide sanitary napkins without attachment tabs but which are maintained in place on the body of the wearer by having adhesive attachment means to removably secure the pad to the crotch portion of undergarments such as panties, girdles, and the like.

In general, it has mostly been proposed that catamenial napkins and protective liners for undergarments be adhesively secured into the crotch portion of the undergarment by using a so-called "double-faced," pressure-sensitive adhesive tape which is positioned on the underside of the absorbent pad, i.e., the side worn away from the body. The double-faced, pressure sensitive adhesive tapes have consisted of an adhesive mass coated on both sides of a substrate filmlike material such as cellulose acetate, polyethylene, polyvinyl chloride, papers, and the like. One side of the double-faced, pressure-sensitive adhesive tape is pressed into attached engagement with the bottom surface of the absorbent pad while the other face of the double-faced, pressure-sensitive adhesive tape is covered with a release strip to protect the adhesive mass until such time as the pad is to be secured into the crotch portion of an undergarment. When it is desired to use the absorbent pad, the release strip is removed from the other adhesive mass of the double-faced, pressure-sensitive adhesive tape and the pad is pressed into the crotch portion of the undergarment where it should remain until it is desired to discard the absorbent pad subsequent to use.

It has been found, however, that such double-faced, pressure-sensitive adhesive tapes as used heretofore failed to perform satisfactorily their intended function. Oftentimes as the pad was removed from the crotch portion of the undergarment subsequent to use, the pressure-sensitive adhesive tape delaminated from the absorbent pad and remained secured to the crotch portion of the undergarment. Also, if the adhesion level of the double-faced, pressure-sensitive adhesive tape was increased sufficiently to prevent delamination from the absorbent pad, it was found that the crotch portion of the undergarment was torn upon attempting to remove the pad therefrom. Also, even more frequently, considerable amounts of the pressure-sensitive adhesive were left embedded in the fabric of the crotch portion of the undergarment leaving undesirable, rough, and unsightly residues which were not readily removed by washing.

All of the above problems were also present when it was proposed to provide adhesive attachment means consisting simply of a pressure-sensitive adhesive applied directly to the bottom surface of the protective pad. Furthermore, attempts to apply so-called "pressure-sensitive adhesives" directly to the under surface of the pads could not be accomplished without slowing down the rate of production. Such cold pressure-sensitive adhesives required too great a period of time to cure and even if the rate of production was slowed down sufficiently to permit curing of the pressure-sensitive adhesive, the same was not bonded to the bottom surface of the liner with sufficient tenacity to prevent delamination when the liners were in use.

Then with the advent of very rapid-setting thermoplastic (hot melt), pressure-sensitive adhesives, it was thought that the direct application of pressure-sensitive adhesives to the bottom surface of protective liners could be accomplished at a high rate of production. However, when the bottom surface of such protective liners consisted of a thermoplastic barrier sheet, it was found that the direct application of hot melt adhesives to the film surface caused the areas where the thermoplastic, pressure-sensitive adhesives were applied to soften or melt thereby disturbing the integrity of the film to which they were applied. This distortion of the thermoplastic barrier films resulted in the formation of perforations and unsightly ripples and wrinkles thus rendering the protective liners incapable of performing their intended function.

We have now discovered an improved way for providing adhesive attachment patterns directly to thermoplastic films forming the bottom surface of removable protective liners or sanitary napkins for the protection of nether garments which overcomes all the aforementioned difficulties and shortcomings of the prior art adhesive attachment means and which can be made economically on high-speed production equipment to provide safe and secure attachment of such absorbent pads during use while being readily and easily removed subsequent to use.

SUMMARY OF THE INVENTION

In accordance with the present improvements, an absorbent protective liner comprising an absorbent core of highly absorbent material having a fluid pervious cover overlying the top surface of said core and a thermoplastic, fluid impervious, protective barrier film overlying the bottom surface of said core is provided with thermoplastic, pressure-sensitive adhesive patterns fused to the thermoplastic barrier film on the bottom surface of the absorbent liner. The surface of the thermoplastic, pressure-sensitive adhesive pattern is covered with a removable release strip which, upon removal, provides for temporary but secure attachment of the protective liner to the crotch portion of a nether garment.

Further, by the present invention, thermoplastic, pressure-sensitive adhesives are fused to the thermoplastic, fluid impervious, protective barrier films by first coating a release surface with the thermoplastic, pressure-sensitive adhesive in a fluid state and then bringing the exposed surface of the heated thermoplastic, pressure-sensitive adhesive into contact with the thermoplastic barrier film which causes the thermoplastic, pressure-sensitive adhesives to be fused to the thermoplastic barrier film without causing the barrier film to become physically distorted or perforated in the area coated by the thermoplastic, pressure-sensitive adhesive.

DESCRIPTION OF THE DRAWINGS

The improvements of the present invention will be more readily understood by reference to the following detailed description when read in conjunction with the accompanying drawings in which:

FIG. 1 is a perspective view of the protective liner of the present invention as viewed from the top;

FIG. 2 is a perspective view of the protective liner as viewed from the bottom;

FIG. 3 is a cross-sectional view taken approximately along lines 3-3 of FIG. 1;

FIG. 4 is a cross-sectional view taken approximately along lines 4-4 of FIG. 1;

FIG. 5 is an enlarged fragmentary cross-sectional view taken approximately along lines 5-5 of FIG. 2;

FIG. 6 is a fragmented perspective view showing removal of the release paper from the thermoplastic, pressure-sensitive adhesive pattern existent on the surface of the thermoplastic protective barrier film of the protective liner;

FIG. 7 is a perspective view seen from above showing the protective liner positioned and secured in the interior crotch portion of a panty undergarment;

FIG. 8 is a schematic diagram shown in perspective of apparatus for making the protective liner of the present invention showing particularly the application of the thermoplastic, pressure-sensitive adhesive to the thermoplastic barrier film that forms the bottom surface of the protective liner; and FIG. 9 is a schematic diagram of another embodiment for applying the thermoplastic, pressure-sensitive adhesive to the thermoplastic barrier film on the bottom surface of the protective liner of the present invention.

Referring now, first to FIGS. 1 and 2, there is illustrated a protective, absorbent pad, generally designated by the numeral 10, which includes an absorbent core 12 covered over the top surface and the sides by a fluid pervious cover 14 and over the bottom surface by a thermoplastic, fluid impervious barrier film 16 for the usual purpose of preventing strikethrough of absorbed body exudates. The absorbent core 12 can be made from any of the many well-known materials having absorbent characteristics such as comminuted wood pulp, cotton linters, rayon fibers, cotton staple, bleached sulfite creped wadding, natural and synthetic polymeric foams, and the like and combinations thereof. The fluid pervious cover 14 can be a knitted, woven, nonwoven or perforated paper material, and the like which extends only slightly beyond the ends of the core 12 where it is secured by an adhesive 17 (FIG. 4) to the thermoplastic, fluid impervious barrier film 16 which can be of the usual polyethylene, polypropylene, or similar thermoplastic films. The thermoplastic barrier film 16 is also secured by the adhesive 17 to the bottom surface of the core 12 and to the longitudinal edges of the fluid pervious cover 14 where they are sandwiched between the bottom surface of the core 12 and the marginal edges of the inner surface of the barrier film 16. (FIGS. 3 and 4).

On the under surface of the absorbent pad 10, the side covered with the impervious thermoplastic barrier film 16, is a pattern of thermoplastic, pressure-sensitive adhesive 18 extending in a lengthwise direction. In a manner to be described more fully hereafter, the pattern of thermoplastic, pressure-sensitive adhesive 18 is fusion bonded to the thermoplastic barrier film 16 so as to form a permanent bond therebetween yet such fusion is accomplished without physical distortion of the structural integrity of the barrier film 16.

The thermoplastic or hot melt, pressure-sensitive adhesive pattern 18 can be a continuous line extending from end to end of the pad 10, as is illustrated, which would result from a continuous extrusion of the hot melt, pressure-sensitive adhesive onto the thermoplastic film in a continuous manner as the protective liners 12 are being made. However, the pattern of thermoplastic, pressure-sensitive adhesive 18 can be intermittent by interrupting the application of the thermoplastic adhesive to the continuously moving production liner of the absorbent protective liners 10 or it can be of any desired pattern by using well-known printing or spraying techniques. The exact pattern to be selected is dependent only upon the level of adhesion required by the protective liners of the present invention which indirectly is dependent upon the inherent adhesive level existent in the particular thermoplastic, pressure-sensitive adhesive employed. That is to say, the greater the inherent adhesion level of the thermoplastic, pressure-sensitive adhesive used, the smaller will be the surface area of the thermoplastic, pressure-sensitive adhesive pattern 18 applied to the thermoplastic layer 16 of the liner 10.

Because nether garments are made from a wide variety of fabrics, the adhesion level of the thermoplastic, pressure-sensitive adhesive pattern 18 is adjusted by varying the surface area of the pattern so as to fall within a specific range. The adhesion level is defined as that force required to strip or peel away a thermoplastic film used as the barrier film in the protective liners 10, from the surface of a stainless steel plate subsequent to its being pressed into adhesion therewith by the thermoplastic, pressure-sensitive adhesive pattern 18 on the surface of the thermoplastic film 16 and is quantified as ounces per inches of width of the adhesive pattern. The thermoplastic, pressure-sensitive adhesive patterns 18 employed with the liners of the present invention must have a level of adhesion, as above defined, ranging from about 20 to about 50 ounces per inch width and preferably ranging from about 32 to about 37 ounces per inch width. Having a level of adhesion falling within the above ranges assures excellent adhesion of the thermoplastic, pressure-sensitive adhesive patterns 18 to fabrics regardless of the yarns from which the fabrics are made because the bond not only adheres well to the surface of the yarns because of its physical nature, but actually flows in and around the courses and whales of the knitted fabric intricately multiplying the surface area contact. Furthermore, because of the integrity of the hot melt, pressure-sensitive adhesives, the adhesive pattern 18 readily releases cleanly from the fabrics upon the application of a positive and directional pull without leaving unsightly residues of adhesive.

When it is desired to use a pad 10, it is merely necessary to strip away the release paper 19 covering over the pressure-sensitive adhesive pattern 18 (FIG. 6) and place the pad 10 into the interior of the crotch portion 20 of a nether garment, such as a panty 22 (FIG. 7), with the pressure-sensitive adhesive pattern 18 facing the inner surface of the interior crotch portion 20. Subsequent to use, the pad 10 can be easily removed from the interior crotch portion 20 of the panty 22 by merely lifting the same off the surface by the application of a positive and directional pull.

Referring now particularly to FIGS. 8 and 9, suitable apparatus and methods for making the sanitary napkin 10 of the present invention will be readily understood. A continuous web of cover material 14 carrying longitudinally spaced pads of absorbent material 12 are conveyed by a first endless belt conveyor 30 with the lateral edges of the cover material 14 extending up over the sides of the absorbent pads 12 and over the top marginal edges thereof. It is to be noted, however, that in describing the method and apparatus of FIGS. 8 and 9, the absorbent protective liners 10 are being made upside down from the description of the liner itself in relationship to its position when worn. Accordingly, when describing the top surface with respect to the apparatus of FIG. 8, it is in reality the bottom surface of the absorbent protective liner 10, i.e., that surface worn away from the body.

A continuous web 16 of thermoplastic film material, such as polyethylene or polypropylene and the like, passes over a cylindrical applicator 32 which coats the bottom surface of the polyethylene or polypropylene film 16 with an adhesive 17 which will secure the polypropylene film to the cover material 14 and the absorbent pads 12. The continuous film 16 is then fed into a nip defined between a pressure roll 34 and the top surface of the pad carrying continuous web of cover material 14 where it is secured to the top surface of the continuous web of cover material and the pads 12 carried thereby. From another supply roll, a narrow continuous web 19 of a silicone-coated release paper is fed over the compression roll 34 between the upper surface of the polyethylene or polypropylene web 16 and the surface of the compression roll 34. Above the silicone-coated release paper 19, a heated nozzle 38 applied a continuous strip 18 of thermoplastic (hot melt), pressure-sensitive adhesive which travels then with the continuous strip 19 of silicone-coated release paper and is applied to the outer surface of the continuous web 16 of polyethylene or polypropylene film. Once joined together into a continuous sheet of combined components, the continuous sheath is conveyed to a rotary cutoff station 39 which includes upper 40 and lower cutoff blades 42 which are timed to meet and sever the continuous sheath between the longitudinally spaced absorbent pads 12 contained therein. The cutoff mechanism 39 also serves to bond the cutoff edges of the cover material 14 and the thermoplastic film 16 beyond the ends of the pads 12. Once severed, the individual protective liners 10 are then conveyed by a second continuous conveyor 44 to further processing or packaging.

The embodiment of the apparatus shown in FIG. 9 is substantially the same as that described above with respect to FIG. 8 except that a release paper 19 is not used in those instances where the thermoplastic, pressure-sensitive adhesive patterns 18 do not need a protective cover. In this embodiment the compression roll 34 is provided with a release surface such as a silicone or Teflon coating. The thermoplastic, pressure-sensitive adhesive 18 is applied directly to the surface of the roll 34 from a heated nozzle 38 in a continuous strip and is then applied to the outer surface of the continuous web 16 of thermoplastic film material as it is passed into the nip defined between the compression roll 34 and the upper surface of the continuous sheath of combined components passing below the compression roll 34. Once thus joined, the continuous sheath of combined components is then severed by rotary cutoff apparatus in the identical manner as described with respect to the apparatus of FIG. 8.

Even though the apparatus of FIG. 9 is such as would be used where a protective release strip 19 is not needed, such a strip can still be supplied, if desired, by merely having a supply roll of the silicone-coated paper 19 downstream of the compression roll 34 (but upstream of the cutoff station 39) which feeds the strip over a second compression roll 46 onto the top surface of the continuous combined sheath overlying the pressure-sensitive adhesive pattern 18.

A particularly suitable, thermoplastic (hot melt), pressure-sensitive adhesive for use in making the protective liners of the present invention is one designated Adhesive 03043 available from the United Shoe Machinery Corporation. This adhesive is ideally extruded at a temperature of about 300° F. and forms an excellent fusion bond to a polyethylene film of about 5 mils. thickness at a temperature of about 200° F. First extruding the thermoplastic, pressure-sensitive adhesive 18 onto the silicone-coated release paper 19 or to a release surface roll 34, such as a silicone- or Teflon-coated roll, prior to joining the adhesive 18 to the polyethylene film 16, allows for sufficient cooling of the thermoplastic, pressure-sensitive adhesive so that it will not destroy the structural integrity of the polyethylene film to which it is being applied. To assure the proper fusion-bonding temperature of the thermoplastic, pressure-sensitive adhesive, the distance from the nip under the pressure roll 34 where the adhesive 18 is joined to the polyethylene film 16 to the position of the heated hot melt extrusion nozzle 38 is adjusted as desired. If the nozzle 38 is too close to the nip under the pressure roll 34, the fusion bond existent between the thermoplastic, pressure-sensitive adhesive pattern 18 and the polyethylene film 16 extends completely through the polyethylene film creating perforations and unsightly wrinkles and ripples. If the extrusion nozzle 38 is placed too far from the nip under the pressure roll 34, the fusion bond between the thermoplastic, pressure-sensitive adhesive patterns 18 and the polyethylene film 16 does not extend sufficiently into the polyethylene film to assure a permanent bond between the pressure-sensitive adhesive pattern and the polyethylene film. In any event, the distance, and thereby the time interval, is selected such that the fusion bond between the thermoplastic, pressure-sensitive adhesive pattern and the polyethylene film extends no more than half way through the thickness of the film. By maintaining such a relationship, the structural integrity of the thermoplastic film is not destroyed by the hot application of the thermoplastic, pressure-sensitive adhesive.

While thermoplastic, pressure-sensitive Adhesive 03043 from the United Shoe Machinery Corporation is ideal for practicing the present invention, many other thermoplastic, pressure-sensitive adhesives can also be used. It is only necessary that the pressure-sensitive thermoplastic adhesive have an extrusion temperature (melting point) ranging from about 225° F. to about 400° F. and that it be joined to the thermoplastic polyethylene or polypropylene films at a temperature ranging from about 175° F. to about 250° F. However, as mentioned above, the exact temperature of fusion bonding can be adjusted by varying the distance between the extrusion nozzle and the nip defined under the pressure roll where the thermoplastic, pressure-sensitive adhesive is joined to the thermoplastic film. This can be accomplished in the embodiment shown in FIG. 8 by moving the nozzle 38 in an upstream or downstream direction overlying the strip of silicone-coated release paper 19, and in the embodiment depicted in FIG. 9, by increasing or decreasing the diameter of the pressure roll 34.

From the above, it is seen that the present invention provides an improved adhesive attachment for removable protective liners or sanitary napkins for the protection of nether garments which assures safe and secure attachment for the absorbent pads during use while permitting the pads to be readily and easily removed subsequent to use.

Having thus described out invention, we claim:

1. A protective absorbent liner for nether garments comprising:
   a. a core of absorbent material;
   b. a fluid pervious cover overlying the top surface and the side edges of said core;
   c. a fluid impervious, thermoplastic barrier film secured to and overlying the bottom surface of said core;
      1. the lateral edges of said fluid pervious cover being spaced apart on the bottom surface of said core and sandwiched between said core and said barrier sheet in secured relationship therewith, and
      2. the end margins of said cover and said barrier sheet being secured to one another in face to face relationship beyond the end edges of said core;
   d. and pressure-sensitive adhesive attachment means fusion bonded on the outer surface of said barrier film for temporarily, but securely, adhering said liner to the interior of the crotch portion of a nether garment.

2. The protective absorbent liner of claim 1 wherein the fusion bond existent between said thermoplastic barrier film and said pressure-sensitive adhesive attachment extends into said barrier film no greater than one-half the thickness of said film.

3. The protective absorbent liner of claim 1 wherein said adhesive attachment means is a pattern of thermoplastic, pressure-sensitive adhesive extending lengthwise, end to end, of said liner.

4. The protective absorbent liner of claim 1 wherein said pressure-sensitive adhesive has a level of adhesion ranging from about 20 to about 50 oz./in. width.

5. The protective absorbent liner of claim 1 wherein said pressure-sensitive adhesive has a level of adhesion ranging from about 32 to about 37 oz./in. width.

6. The protective absorbent liner of claim 3 wherein said thermoplastic, pressure-sensitive adhesive has an extrusion temperature ranging from about 225° F. to about 400° F.

7. The protective absorbent liner according to claim 3 wherein said thermoplastic, pressure-sensitive adhesive has an extrusion temperature of about 300° F.

8. The protective absorbent liner of claim 1 wherein said pressure-sensitive adhesive is covered by a removable, protective release strip when said liner is not in use.